United States Patent
Finger

(10) Patent No.: US 8,251,201 B2
(45) Date of Patent: Aug. 28, 2012

(54) BOTTLE PROCESSING SYSTEM

(75) Inventor: Dieter Finger, Neutraubling (DE)

(73) Assignee: Krones AG (DE)

( * ) Notice: Subject to any disclaimer, the term of this patent is extended or adjusted under 35 U.S.C. 154(b) by 613 days.

(21) Appl. No.: 12/518,424

(22) PCT Filed: Nov. 20, 2007

(86) PCT No.: PCT/EP2007/010025
§ 371 (c)(1),
(2), (4) Date: Jul. 1, 2009

(87) PCT Pub. No.: WO2008/071293
PCT Pub. Date: Jun. 19, 2008

(65) Prior Publication Data
US 2010/0059331 A1    Mar. 11, 2010

(30) Foreign Application Priority Data
Dec. 14, 2006 (DE) .......................... 10 2006 059 001

(51) Int. Cl.
*B67C 3/00* (2006.01)
(52) U.S. Cl. ................ 198/341.09; 198/617; 198/459.2; 198/459.8
(58) Field of Classification Search ............. 198/341.09, 198/617, 459.2, 459.8
See application file for complete search history.

(56) References Cited

U.S. PATENT DOCUMENTS

| | | | |
|---|---|---|---|
| 2,932,376 A | 4/1960 | Millington | 198/19 |
| 7,743,907 B2 * | 6/2010 | Weinbrenner et al. | 198/459.2 |
| 7,886,894 B2 * | 2/2011 | Schill et al. | 198/459.2 |

FOREIGN PATENT DOCUMENTS

| | | |
|---|---|---|
| CN | 1335818 | 2/2002 |
| DE | 2436591 | 2/1976 |
| DE | 25 07 419 | 9/1976 |
| DE | 33 10 248 | 9/1984 |
| DE | 199 28 325 | 6/1999 |

OTHER PUBLICATIONS

Chinese Official Action + translation issued in corresponding Chinese Appln. Serial No. 200780045949.1, dated Apr. 20, 2011 (16 pgs).

* cited by examiner

Primary Examiner — Mark A Deuble
(74) Attorney, Agent, or Firm — Hayes Soloway P.C.

(57) ABSTRACT

The invention relates to a device and a method of processing containers. Herein, a processing system is used in which all of the processing units for the containers are kinematically rigidly coupled to one another. According to the invention, a specified number of containers is supplied to the first processing unit of the system and the working speed of the system is reduced after the last container has left the first processing unit and before the specified number of the first containers has reached the second processing unit.

21 Claims, 1 Drawing Sheet

US 8,251,201 B2

BOTTLE PROCESSING SYSTEM

BACKGROUND OF THE INVENTION

The present invention relates to a method of controlling a system for processing containers and a device for controlling a system for processing containers. The present invention will be described with reference to a system including a blowing machine or a blowing device for plastic bottles and a filling system downstream thereof for filling the containers. However, it is to be noted that the present invention is also applicable to other systems having other processing units for containers.

Such systems which include a blowing machine for containers and a filling machine downstream thereof for the containers, are known from the prior art. In this connection it is also known from the prior art to couple these two processing units kinematically to one another, which means in this case any change of speed in one machine will automatically effect also a change of speed in the other machine. Such systems are the object of the present invention and will be referred to herein also as a block design system. It is further known to separate the various processing units in such systems kinematically from one another, which means for example to allow different working speeds of the two processing units and also a change to the working speed in one unit, while the working speed of the other unit is maintained.

In order to manage such speed differences, a number of diverse devices is known from the prior art. For example, it is known from FR 2 333 613 to provide a conveyor belt for the containers between the two processing units, which conveyor belt has a variable length and is therefore used as a buffer for the containers. From the U.S. Pat. No. 2,932,376 also an automatic transfer unit is known which is also used for buffering different working speeds of two machines to be connected. From the DE 33 10 248 C2 there is also known a transport and diverting device in a bottle processing system, and in this case, too, the drive units of the two machines to be connected may be separated from each other.

As a result of this separation of drives, however, on the one hand the various processing units will have to be installed at a certain spatial distance from one another, with buffer means for containers inserted in between, in order to avoid that for example a short-term standstill of the machine will have influence on the remaining machines of the system. Apart from that, however, these buffer means between the units will themselves introduce a certain vulnerability to failures, and in the case of a failure of the buffer means, the entire system will have to be stopped. The DE 24 36 591 therefore describes a bottle processing system wherein both machines as well as a transfer device disposed between the two are operated synchronously.

During the operation of the above-described system, however, the problem occurs that under certain conditions individual processing units are preferably to be operated at different working speeds, whereas other processing units in the same system need to be operated essentially at the same working speed at all times. For example, it is required for a blowing machine to be operated always at the same working speed, since the intervals during which for example the containers are guided through an oven are precisely determined. Also, the containers have to be blown after an exactly defined time delay after the heating process.

Other machines, however, need to be operated, at least at times, at different speeds. For example, the problem might occur that a bottle filling machine, in the case of a product change, has to start up at a slow speed to make sure that the product which is initially too warm will not brim over. Also, the last containers or bottles can usually not be filled at the full power or working speed, since the level of the product they are to be filled with, and thus the flow speed of the product, decreases in the storage (ring) vessel.

Since, however, the blowing machine, as mentioned, can not or only with major restrictions control its speed, it would be conceivable to provide two operating protocols for the blow-fill-block, one operating protocol for starting up and idle running the block and a second operating protocol for normal operation. With the first protocol, the block will run at a slower speed in order to counteract any foam formation during filling, the second protocol allows an operational mode at normal speed. However, in this case those two protocols will always have to be kept at the same level for the operation of the block. This means that during certain operator adaptations, which may for example have an effect on the first protocol, the second protocol will always have to be adapted accordingly, since otherwise the desired effect may be diminished or cancelled when changing from protocol 1 to protocol 2. This results in the protocol requiring quite a considerable service effort. This variant, however, may well be useful in the case of applications where for example only medium requirements are posed on the quality of the bottles, which means that the protocol is adapted only relatively seldom, since the second protocol, too, will not have to be adapted frequently.

SUMMARY OF THE INVENTION

The present invention is therefore based on the object of allowing in a system having processing units kinematically rigidly coupled to one another the speed of one unit to be changed, whilst the working speed of the other unit may be maintained.

In the method according to the invention for controlling a system for processing containers, including a first processing unit processing the containers in a first predetermined manner, a second processing unit processing the containers in a second specified manner, which is different from the first manner, wherein the first processing unit and the second processing unit are kinematically rigidly coupled to each other and wherein the second processing unit is located downstream of the first processing unit in the transport direction of the containers, the supply of containers into the first processing unit is interrupted at a first specified point in time and the working speed of the processing units is reduced at a second point in time which is later than the first point in time, with the working speed not being reduced until after essentially all of the containers in the first processing unit have been processed. To this end, the reduction of the working speed may be reduced in a stepwise fashion, however, it will preferably be continuously reduced.

The term kinematic coupling is to be understood in the following to mean that any changes to the working speed will necessarily have to be made to both processing units.

By interrupting the supply of containers at a first specified point in time it will be achieved that the first processing unit will run idle after a certain time, which means it will not process any more containers. As soon as essentially all of the containers have left the first processing unit, the working speed of the entire system may be reduced.

Essentially all of the containers is understood to mean that it is also possible to have embodiments wherein individual containers are still being processed in the first processing unit whilst the working speed is already being reduced. In this case, these individual vessels are usually to be treated as scrap, since they were not processed properly. Since therefore the system operator will accept a certain amount of scrap, it is also possible to continue processing individual containers whilst the speed of the system is already being reduced. Further, in this connection it is to be taken into account that the containers in many embodiments are supplied in specified numbers or in rows (also referred to as shots below) and in this process, usually the first and the last containers of this row will not be properly blown anyway, since these vessels are covered only on one side whilst passing through the heating and therefore the process parameters in their entirety (e.g. in the heating oven for preforms) for these containers are not correct.

The present invention is further achieved by means of a method of controlling a system of the above-described kind, wherein a specified number of containers is fed to the first processing unit and the working speed of the system is reduced, after the last container of this number of containers has been processed by the first processing unit or has left the first processing unit and before the first container of the predefined number has reached the second processing unit. By means of this it is achieved that on the one hand the specified number of containers may be filled at a reduced working speed, as this is for example necessary when emptying the storage vessel of the filling machine. At the same time, however, the containers have been manufactured or blown at the full working speed.

With this method again a higher amount of scrap vessels may have to be accepted and it is therefore also possible that individual vessels are still in the first processing unit while the speed is being reduced, or that on the other hand some vessels are already in the second processing unit or the filling unit prior to reducing the working speed.

Preferably, the containers between the first processing unit and the second processing unit are transported by means of a conveying device, with this conveying device preferably being kinematically coupled to the two processing units. Thus, preferably essentially all of the containers are in the conveying device by the time the working speed of the system is reduced, and this conveying device is for example an intermediate chain.

If necessary, the above-described method may be carried out multiple times, which means specified numbers of containers may be fed to the first processing unit successively multiple times, and once these have left the processing unit the working speed of the entire system may be reduced in each case. For example, it may be possible to feed such designated numbers (also referred to as shots below) until one filling of a ring vessel has been used up.

Preferably, the first processing unit is a blowing machine and particularly preferably the second processing unit is a bottle filling machine. Here, however, also other container processing machines may be provided, such as for example labelling machines, closing machines, inspection devices for containers and the like.

Thus, particularly preferably the containers in the first processing unit will always be processed at the same working speed and the speed of the entire system will only be reduced if the first processing unit is running idle.

A further possible approach would also be to reduce the number of containers supplied to the first processing unit, whereby for example the distances between the containers in the transport direction would be increased. This approach would then make it possible to maintain the working speed in the first processing unit and to reduce at the same time, since effectively a lower amount of containers will reach the second processing unit, their working speed.

In this connection it is to be noted, however, that for example in the case of blowing machines also the distance of the containers between each another is a critical parameter which affects the blowing process (at least in the heating oven).

Preferably, the containers in the first processing unit are supplied in batches of specified numbers. Thus, in this embodiment a supply is carried out not continuously, but in shots of the specified numbers. It is, however, also possible to combine the two variants, which means to supply the containers continuously in normal operation and to supply, for example during an idle operation (i.e. during idle running of the machine), the containers in specified batches or shots.

In the above embodiments, so far mention has always been made of reducing the working speed of the system at a second point in time in relation to the working speed of the system at a first point in time. Reducing is to be understood to mean a general adaptation so that the scope of protection also encompasses solutions wherein the working speed of the system is increased at a second point in time in relation to the working speed of the system at a first point in time.

The present invention further relates to a system for processing containers, which includes a first processing unit which processes the containers in a first specified manner. Further, a second processing unit is provided which processes the containers in a second specified manner which is different from the first manner. Herein, the first processing unit and the second processing unit are kinematically rigidly coupled t one another. In this connection, the second processing unit is located downstream of the first processing unit in the transport direction of the containers.

According to the invention, the system includes control means which cause the supply of containers to the first processing unit to be interrupted at a first specified point in time and the working speed of the system to be adapted, preferably reduced, at a second point in time which is later than the first point in time, with the second point in time being selected such that no more containers will be processed in the first processing unit at the second point in time.

Preferably, the system includes a conveying device conveying the containers from the first processing unit to the second processing unit. Herein, the conveying device in its entirety is preferably also kinematically rigidly coupled to the processing unit.

Alternatively, the control device may also cause a specified number of containers to be supplied to the first processing unit and the working speed of the system to be reduced, after the last container has left the first processing unit and before the first of the specified number of containers has reached the second processing unit. Thus, particularly preferably all of the containers will be in the conveying device at the point in time t2.

A conveying device is understood to mean any device suitable for conveying containers, such as in particular, but not exclusively, conveyor chains, screw conveyors, conveyor wheels, conveyor belts, revolving stars and the like. A conveying device preferably includes conveyor elements having containers allocated thereto. Conveyor elements may preferably be grippers for bottles, preferably neck grippers which are attached to an endless belt.

Preferably, the system also includes a supply unit supplying the containers to the first processing unit.

Further, a detection device is preferably provided which detects containers in the first processing unit. Thus, it is for example possible to select the point in time t2 depending on an output signal from this detection device, for example to determine by optical means whether all of the containers have left the first processing unit, in order to reduce only then the working speed of the system.

In a further advantageous embodiment, the system has a batching device causing the containers of the first processing unit to be supplied at least at times in batches. This batching device may for example be a closure system in the supply device, which as a result of purposeful opening and closing allows only certain numbers of containers to enter into the first processing unit. This batching is of interest in particular in the context of an idling operation.

In a further advantageous embodiment the control device causes the working speed of the system to be adapted, preferably reduced, before the first container of a certain batch or a certain shot is processed in the second processing unit.

According to a preferred further development of the invention, the system is a blow-fill-block, which means it couples a blowing machine and a filling machine kinematically rigidly to one another, for CSD applications, also for carbonised soft drinks such as lemonade or cola. For it is particularly here that the problem occurs that, in the case of a product change, foam is formed whilst the content of the first ring-vessel is filled into the containers.

BRIEF DESCRIPTION OF THE DRAWINGS

Further advantageous embodiments will become obvious from the attached drawings, wherein.

DETAILED DESCRIPTION OF THE INVENTION

Figure 1A:
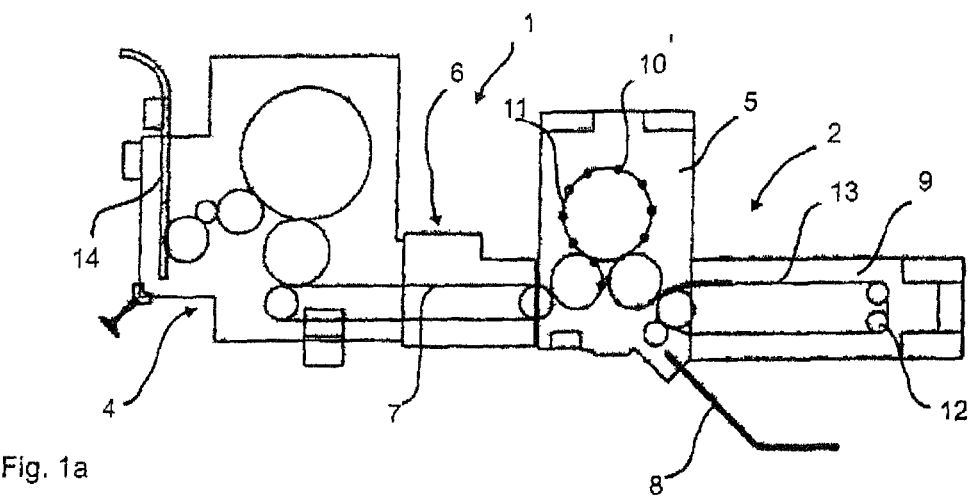
FIG. 1a shows a system according to the invention in a first operating condition.

FIG. 1 shows a system 1 according to the invention in a first operating condition, in which the entire system 1 is operated at a high speed or the regular working speed. What is shown here is the situation in which a plurality of containers 10 have just been arranged in the first processing unit 2, which is a blowing machine, or pass through it. Here, the containers are initially transported by means of a conveying device 13 through an oven 9 and heated therein. The reference numeral 12 relates to a guide roller for the conveyor belt or the conveyor chain 13. The containers 10 are supplied to the system 1 via a supply device 8.

After an exactly defined heating period, in which the parameters, such as the working speed, for this heating process are precisely established, the containers 10 are blown in the actual blowing device 5, which is also a component of the first processing unit 2, and are brought to their design size. The reference numeral 11 herein relates to the blow wheel which conveys a plurality of containers 10.

The first processing unit 2 is followed by a conveying device 6 including a conveyor chain 7. This conveying device 6, too, is preferably kinematically rigidly coupled to the two processing units 2 and 4. The second processing unit 4 is a filling machine which fills the content into the containers 10 already formed. The reference numeral 14 relates to an outlet for transporting off the containers 10 already filled. FIG. 1 therefore shows an operating condition after the point in time t1, which means here the supply of containers 10 from the supply device 8 into the oven 9 has already been stopped.

Figure 1B:
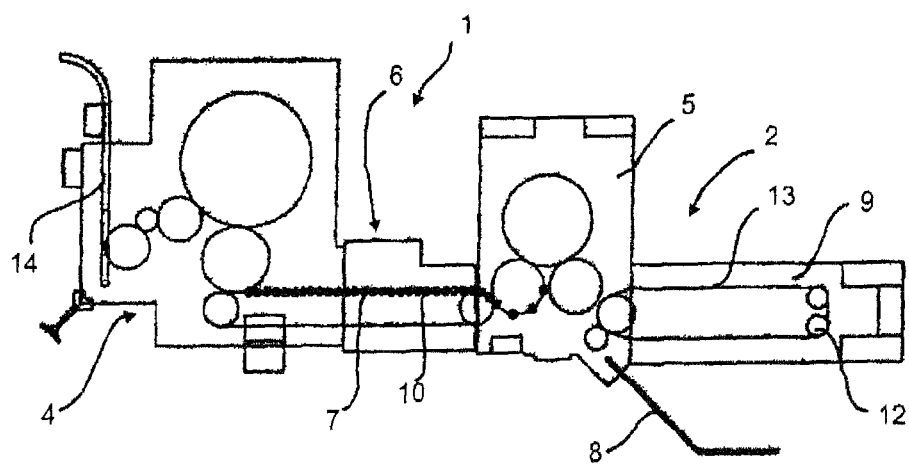
FIG. 1b shows the system from FIG. 1a in a second operating condition.

FIG. 1b relates to a further operating condition of the system at the point in time t2. Here, all of the containers 10 have already left the first processing unit 2 or the actual processing step, i.e. the stretch blow-moulding of the containers 10, is completed.

Figure 1C:
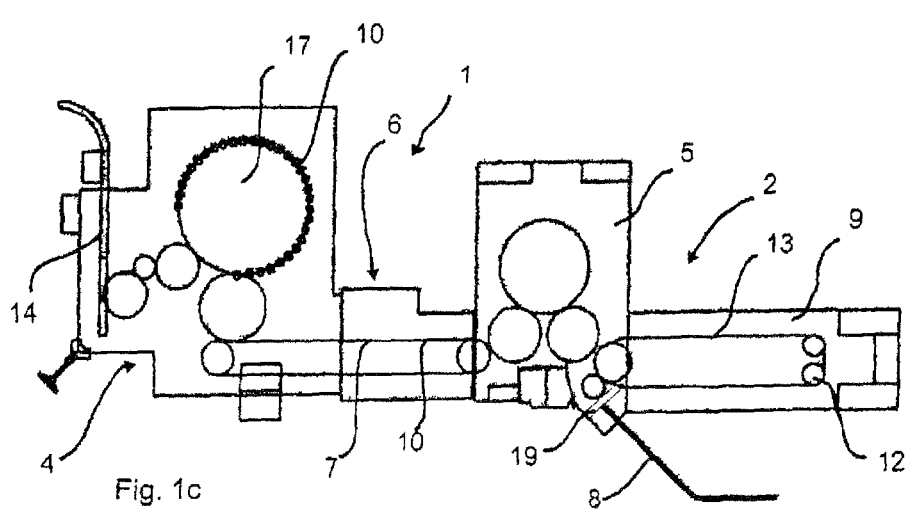
FIG. 1c shows the system from FIG. 1a in a third operating condition.

In principle it would now also be conceivable to begin reducing the working speed, whilst the final container 10 of a shot is just being blown. Usually, the first and the last containers 10 of a shot will not be properly blown, since, as mentioned above, they have no neighbour in front of or behind them and therefore the parameters for these end-side containers are not correctly selected. Beginning from the point in time shown in FIG. 1b, the working speed of the system 1 will now be reduced and the containers 10 will, as shown in FIG. 1c, be supplied to the second processing unit 4.

This second processing unit 4 has a circulation device 17 in which the containers 10 are conveyed to be filled. This filling may now be carried at a slower working speed of the device, so that any foam formation may be prevented. At the same time, this slower working speed has no effect on the first processing unit 2 or the process thereof, since at this point in time there are no more containers 10 in the first processing unit 2. The reference numeral 19 indicates—roughly schematically—a closure mechanism which prevents any containers 10 from entering into the first processing unit 2 during operation at reduced speed. Thus, as detailed above, during operation at a reduced speed, no more containers 10 are supplied to the system 1 or to the first processing unit 2.

All of the features disclosed in the application documents are claimed as essential to the invention, in as far as they are novel either individually or in combination compared to the prior art.

The invention claimed is:

1. A method of controlling a system for processing containers including a first processing unit, in which the containers are processed in a first specified manner, a second processing unit, in which the containers are processed in a second specified manner which is different from the first manner, with the first processing unit and the second processing unit being kinematically rigidly coupled to one another, and with the second processing unit being located downstream of the first processing unit in the transport direction of the containers, wherein the supply of containers into the first processing unit is interrupted at a first specified point in time (t1) and the working speed of the processing units is reduced at a second point in time (t2) which is later than the first point in time, with the working speed not being reduced until after essentially all of the containers in the first processing unit have been processed thereby, and wherin essentially all of the containers located in the system are in a conveying device between the first and second processing units by the second point in time (t2).

2. A method of controlling a system for processing containers including a first processing unit, in which the containers are processed in a first specified manner, a second processing unit, in which the containers are processed in a second specified manner which is different from the first manner, with the first processing unit and the second processing unit being kinematically rigidly coupled to one another, and with the second processing unit being located downstream of the first processing unit in the transport direction of the containers, wherein a specified number of containers is supplied to the first processing unit and the working speed of the system is reduced after the last container of this number has left the first processing unit and before the first container of the specified number has reached the second processing unit.

3. The method as claimed in claim 2, wherein the containers are conveyed between the first processing unit and the second processing unit using a conveying device, said conveying device being kinematically coupled to the two processing units.

4. The method as claimed in claim 2, wherein essentially all of the containers located in the system are in the conveying device by the second point in time (t2).

5. The method as claimed in claim 2, wherein the first processing unit is a blowing machine.

6. The method as claimed in claim 2, wherein the second processing unit is a bottle filling machine.

7. The method as claimed in claim 2, wherein the containers of the first processing unit are supplied in batches of specified numbers.

8. The method as claimed in claim 1, wherein the Containers are conveyed between the first processing unit and the second processing unit using a conveying device, said conveying device being kinematically coupled to the two processing units.

9. The method as claimed in claim 1, wherein the first processing unit is a blowing machine.

10. The method as claimed in claim 1, wherein the second processing unit is a bottle filling machine.

11. The method as claimed in claim 1, wherein the containers of the first processing unit are supplied in batches of specified numbers.

12. A system for processing containers, including a first processing unit in which the containers are processed in a first specified manner, a second processing unit in which the containers are processed in a second specified manner which is different from the first manner, with the first processing unit and the second processing unit being kinematically rigidly coupled to one another, and with the second processing unit being located downstream of the first processing unit in the transport direction of the containers, wherein the system includes a control device causing the supply of containers into the first processing unit to be interrupted at a first specified point in time (t1) and the working speed of the system to be reduced at a second point in time (t2) which is later than the first point in time, with the second point in time (t2) being selected such in relation to the first point in time (t1) that essentially no more containers will be processed in the first processing unit by the second point in time (t2), but essentially all containers present in the system are in a between the first and second processing units conveying device.

13. The system as claimed in claim 12, wherein a detection device is provided which detects any containers present in the first processing unit.

14. The system as claimed in claim 12, wherein the system includes a batching device causing the containers of the first processing unit to be supplied at least at times in batches.

15. The system as claimed in claim 12, wherein the system includes a conveying device located between the first processing unit and the second processing unit in the transport direction of the containers.

16. The system as claimed in claim 12, wherein the conveying device is equipped with a conveyor chain.

17. The system as claimed in claim 16, wherein each Container has conveying devices firmly allocated thereto.

18. The system as claimed in claim 16, wherein the conveyor chain has a defined pitch in the area of the conveyor device.

19. The system as claimed in claim 16, wherein the conveyor chain includes grippers.

20. The system as claimed in claim 19, wherein the grippers comprise neck Grippers.

21. The system as claimed in claim 12, wherein the first processing unit comprises a stretch blow-moulding machine and/or the second processing unit comprises a filling machine.

* * * * *